(12) United States Patent
Cole

(10) Patent No.: US 12,473,267 B2
(45) Date of Patent: Nov. 18, 2025

(54) PROCESS AND INTERMEDIATE FOR THE PREPARATION OF OXETAN-2-YL-METHANAMINE

(71) Applicant: Eli Lilly and Company, Indianapolis, IN (US)

(72) Inventor: Kevin Paul Cole, Indianapolis, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 803 days.

(21) Appl. No.: 17/779,447

(22) PCT Filed: Dec. 7, 2020

(86) PCT No.: PCT/US2020/063546
§ 371 (c)(1),
(2) Date: May 24, 2022

(87) PCT Pub. No.: WO2021/118906
PCT Pub. Date: Jun. 17, 2021

(65) Prior Publication Data
US 2023/0013840 A1    Jan. 19, 2023

Related U.S. Application Data

(60) Provisional application No. 62/946,146, filed on Dec. 10, 2019.

(51) Int. Cl.
*C07D 305/06*    (2006.01)
*C07D 405/14*    (2006.01)

(52) U.S. Cl.
CPC ......... *C07D 305/06* (2013.01); *C07D 405/14* (2013.01)

(58) Field of Classification Search
CPC ............................ C07D 305/06; C07D 405/14
See application file for complete search history.

(56) References Cited

U.S. PATENT DOCUMENTS

2004/0265236 A1    12/2004    Schirmer et al.

FOREIGN PATENT DOCUMENTS

| WO | 2012153155 | 11/2012 |
| WO | 2013169531 | 11/2013 |
| WO | 2018109607 | 6/2018 |
| WO | 2019239319 | 12/2019 |
| WO | 2019239371 | 12/2019 |
| WO | 2021118906 | 6/2021 |

OTHER PUBLICATIONS

Patent Cooperation Treaty International Search Report pertaining to International Application No. PCT/US2020/063546; International Filing Date: Dec. 7, 2020; Date of Mailing: Feb. 18, 2021.
Patent Cooperation Treaty Written Opinion of the International Searching Authority pertaining to International Application No. PCT/US2020/063546; International Filing Date: Dec. 7, 2020; Date of Mailing: Feb. 18, 2021.

*Primary Examiner* — Shawquia Jackson
(74) *Attorney, Agent, or Firm* — Thomas Weber

(57) ABSTRACT

A process and intermediate for the preparation of a compound of formula (I), or salt thereof.

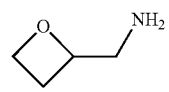

(I)

18 Claims, No Drawings

PROCESS AND INTERMEDIATE FOR THE PREPARATION OF OXETAN-2-YL-METHANAMINE

The present invention relates to a process and intermediate for the preparation of oxetan-2-ylmethanamine, which is a key intermediate in the preparation of certain glucagon-like peptide-1 receptor agonists.

Oxetan-2-ylmethanamine is a key intermediate in the preparation of certain glucagon-like peptide-1 receptor agonists, including certain 1-[2-oxetan-2-ylmethyl]-1H-benzimidazole compounds disclosed in WO2018/109607. The process disclosed in WO2018/109607 for preparing (S)-oxetan-2-ylmethanamine is a five step process starting from (S)-2-((benzyloxy)methyl)oxirane. The first step is a ring expansion step which expands the oxirane to an oxetane. In the penultimate step, the nitrogen of the amine group is introduced using sodium azide and in the final step, the azide intermediate is reduced to provide the amine group. Azide compounds are highly toxic. Certain azide compounds also present significant physical hazards because they can be heat and shock sensitive and can explosively decompose with little input of external energy. As such, the final two steps of this process pose a significant liability and require extensive and costly safety measures.

There is a need for an improved process which is less-resource intensive, cheaper and/or facilitates more efficient production. In particular, there is a need for a process which avoids the use of toxic and hazardous azide compounds. Furthermore, there is a need for a simpler process which requires less manipulation.

The process of the present invention addresses these needs by introducing the protected nitrogen prior to the ring expansion step. The nitrogen is protected by two benzyl groups.

Accordingly, in one embodiment, the present invention provides a process for preparing a compound of the formula:

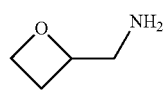

Formula I or salt thereof, comprising the steps of:
i. combining dibenzylamine and a compound of the formula:

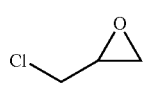

Formula II then adding a base to produce a compound of the formula:

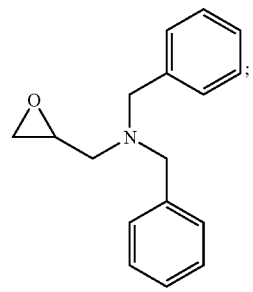

Formula III ii. taking trimethylsulfuxonium halide in the presence of a base and combining with a solution of the compound resulting from step (i) and heating to above 40° C. to produce a compound of the formula:

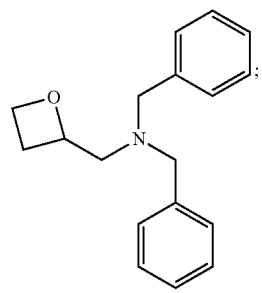

Formula IV and
iii. deprotecting the compound resulting from step (ii).
In an embodiment, the compound of Formula I is:

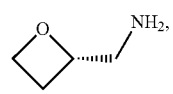

Formula Ia or salt thereof. This formula represents the S-enantiomer.
In an embodiment, the compound of Formula I is the hydrochloride salt of:

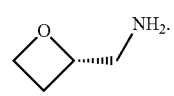

Formula Ia

In an embodiment, the trimethylsulfuxonium halide is trimethylsulfuxonium iodide.

In an embodiment, the base in step (ii) is a different base to the base used in step (i). In an embodiment, the base in step (ii) is selected from an alkali metal hydride, a sterically hindered alkali metal alkoxide, an alkyl lithium in hindered alcohol solvent, an alkali metal hexamethyldisilylazane. In a particular embodiment, the base in step (ii) is selected from: potassium tert-butoxide, lithium tert-butoxide, sodium tert-butoxide, potassium tert-amylate, lithium tert-amylate, sodium tert-amylate, potassium lithium hydride, sodium hydride, potassium hydride, n-butyl lithium in alcohol solvent, lithium hexamethyldisilazide, sodium hexamethyldisilazide, or potassium hexamethyldisilazide. In a preferred embodiment, the base is potassium tert-butoxide.

In an embodiment, the solution in step (ii) comprises a solvent selected from: a polar aprotic solvent or a hindered alcohol. In a particular embodiment, the solvent is selected from: tert-butanol, dimethyl sulfoxide, dimethylformamide, dimethylacetamide, N-methyl-2-pyrrolidone, or tert-amyl alcohol. In a preferred embodiment, the solvent is tert-butanol.

In an embodiment, step (ii) is carried out at a temperature of greater than 70° C. In a preferred embodiment, step (ii) is carried out at a temperature greater than 80° C. In another preferred embodiment, step (ii) is carried out at a temperature between 80 and 90° C. In another preferred embodiment, step (ii) is carried out at a temperature between 80 and 85° C.

In an embodiment, step (iii) is carried out using a palladium catalyst. In a preferred embodiment, the palladium catalyst is palladium on carbon.

The process may further comprise the step (herein step (iv)) of combining a base and a compound of the formula:

Formula V

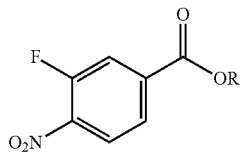

wherein R is H or an acid protecting group, with a solution of a compound of the formula:

Formula I

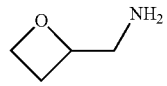

to produce a compound of the formula:

Formula VI

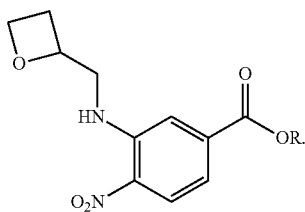

In an embodiment of step (iv), R in the compounds of Formulae V and VI is H or $C_{1-4}$ alkyl. In one embodiment, R is H. In another embodiment, R is $C_{1-4}$ alkyl, preferably methyl.

In an embodiment, R is H and step (iv) comprises combining a base and 3-fluoro-4-nitrobenzoic with a solution of a compound of the formula:

Formula I

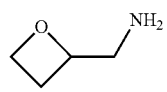

to produce a compound of the formula:

Formula VI'

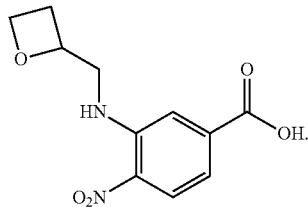

In an embodiment, R is methyl and step (iv) comprises adding a base and methyl-3-fluoro-4-nitrobenzoate to a solution of a compound of the formula:

Formula I

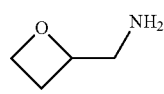

to produce a compound of the formula:

Formula VI″

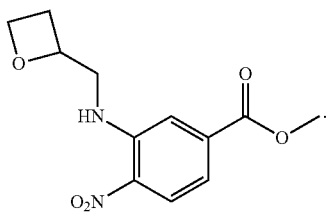

Following on from step (iv), the process may further comprise the step (herein step (v)) of reducing the nitro group of the compound of formula:

Formula VI

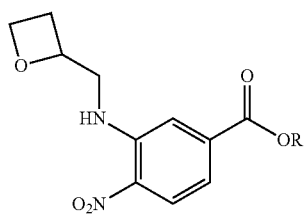

to produce a compound of the formula:

Formula VII

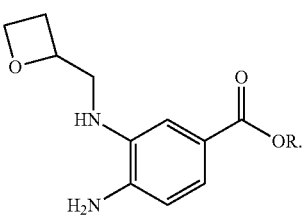

In one embodiment of step (v), R in the compounds of Formulae VI and VII is H. In another embodiment of step (v), R in the compounds of Formulae VI and VII is $C_{1-4}$ alkyl, preferably methyl.

Following on from step (v), the process may further comprise the steps of:

vi. carrying out an amide coupling reaction with a compound of the formula:

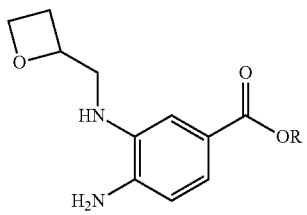

and a compound of the formula:

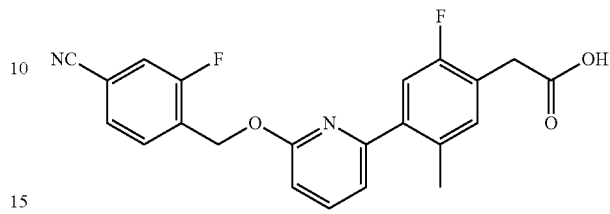

Formula VII

Formula VIII to produce a compound of the formula:

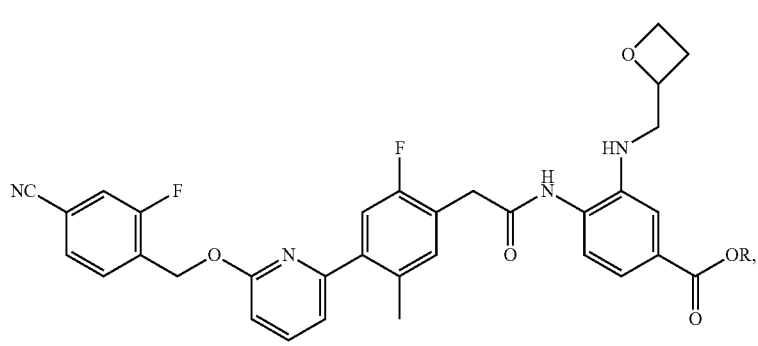

Formula IX or salt thereof;

vii. performing a cyclisation reaction on the compound resulting from step (vi) to produce a compound of the formula:

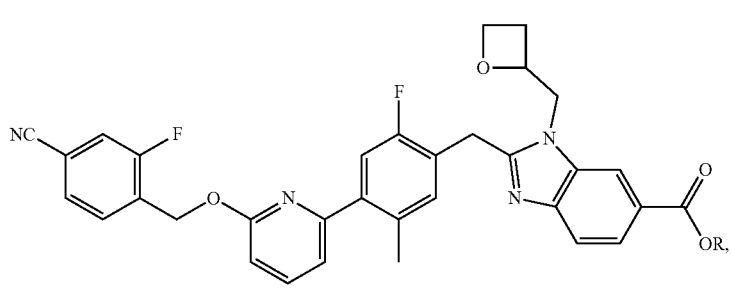

Formula X and optionally reacting to form a pharmaceutically acceptable salt thereof.

In one embodiment of steps (vi) and (vii), R in the compounds of Formulae VII, IX and X is H. In another embodiment of steps (vi) and (vii), R in the compounds of Formulae VII, IX and X is $C_{1-4}$ alkyl, preferably methyl.

In an embodiment, R in the compounds Formulae VI, VII, IX and X is an acid protecting group and the process further comprises the step (herein step (viii)) of hydrolyzing the ester group to produce the acid compound of Formula X wherein R is H:

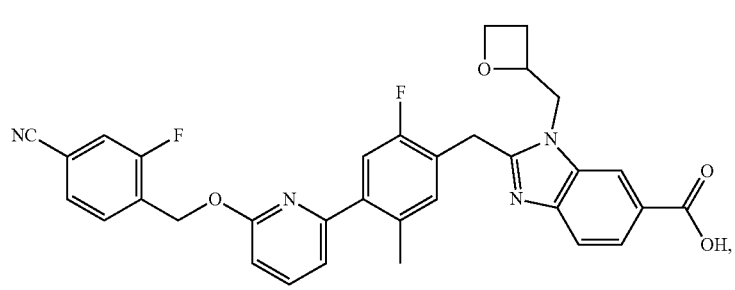

Formula X' and optionally reacting to form a pharmaceutically acceptable salt thereof.

In an embodiment, the compound formed in step (vii) or step (viii) is the tert-butylamine salt of:

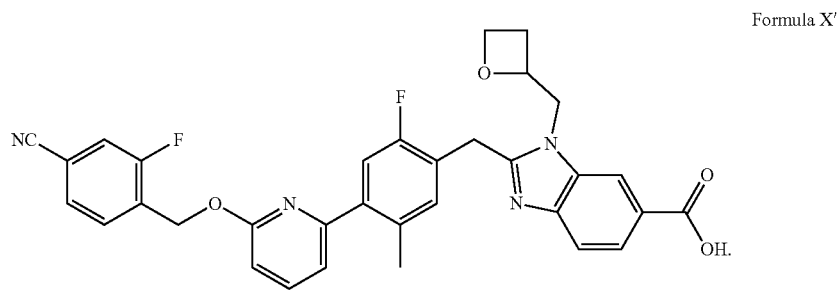 [SMILES: Cc1cc(Cc2nc3ccc(C(=O)O)cc3n2CC2CCO2)c(F)cc1-c1cccc(OCc2ccc(C#N)cc2F)n1]

Formula X'

Preferably, the compound is the tert-butylamine salt of:

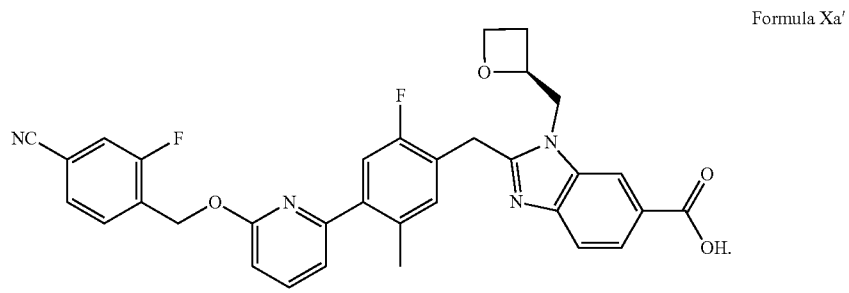 [SMILES: Cc1cc(Cc2nc3ccc(C(=O)O)cc3n2C[C@@H]2CCO2)c(F)cc1-c1cccc(OCc2ccc(C#N)cc2F)n1]

Formula Xa'

In an embodiment, there is provided a compound of the formula:

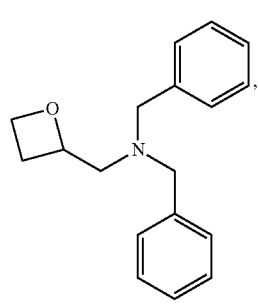

Formula IV or salt thereof.

In a preferred embodiment, the compound is a compound of the formula:

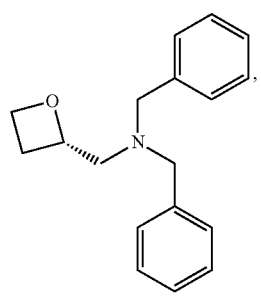

Formula IVa or salt thereof. This formula represents the S-enantiomer.

Further provided herein, is the use of the compound of the formula:

Formula IV

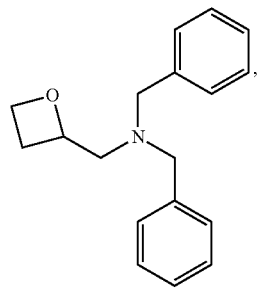

in the preparation of a compound of the formula:

Formula X'

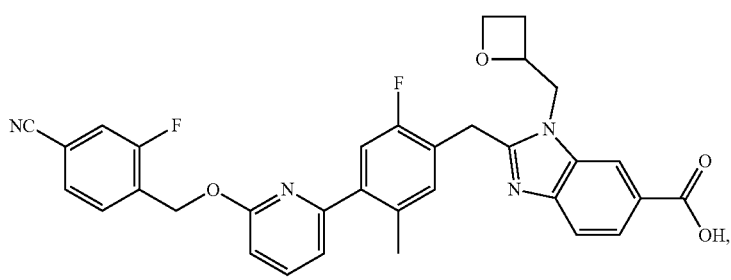

or a pharmaceutically acceptable salt thereof.

The formation of the epoxide in step (i) is known, for example, scheme 1 of Synthetic Communications, 45: 2576-2582, 2015 and Example 1 in WO 2012/153155. The skilled person will appreciate that various bases and solvents may be employed in this step. Suitable solvents include sterically hindered alcohols, in particular, 2-propanol. There are a number of suitable bases including sodium hydroxide, potassium hydroxide and lithium hydroxide. This step may be carried out by adding epichlorohydrin to dibenzylamine and 2-propanol at a low temperature, preferably below 5° C. The reaction mixture may then be heated to ambient temperature, preferably between 20 and 25° C., and stirred. The solution may then be cooled to below 5° C. before adding the base and then re-heating to ambient temperature, preferably about 20° C. Alternatively, the addition of epichlorohydrin to dibenzylamine and 2-propanol may be carried out at a temperature of between 10 and 20° C., followed by the addition of the base and stirring at 20 to 25° C.

The deprotection step (step (iii)) can be carried out by a number of different methods known in the art, "Protective groups in organic synthesis" by T. W. Greene and P. G. M. Wuts, Wiley, 3$^{rd}$ Ed, 1999, Hoboken, N.J., pp 579-580. For example, a palladium catalyst may be used. If the compound of Formula I is the hydrochloride salt, then it is preferable to use between 0.8 and 1 molar equivalents of hydrochloric acid, preferably about 0.9 molar equivalents. A number of solvents may be used in this step including, for example, ethanol or methanol. In one embodiment, the compound resulting from step (ii) is taken forward to step (iii) in solution, for example, in ethanol solution.

Optional step (iv) may be carried out using methods taught in the art, see for example, the method in the preparation of Intermediate 24 in WO 2018/109607. In an embodiment of step (iv), the oxetan-2-ylmethanamine, or salt thereof, is dissolved in dimethyl formamide. In an alternate embodiment, the oxetan-2-ylmethanamine may be used in, for example, a lower alkyl alcohol solution, in particular an ethanol solution. This solution may be carried forward directly from the previous step (iii).

In another embodiment of step (iv), the step is carried out at ambient temperature. In an alternate embodiment, the step is carried out at a temperature of 110 to 120° C.

A preferred base in step (iv) is triethylamine.

Methods of carrying out the reduction of the nitro group to form the amine in step (v) are well known in the art. For example, it may be carried out using a palladium catalyst such as palladium on carbon.

The amide coupling reaction in step (vi) may be carried out using methods known in the art. In one embodiment, the coupling may be carried out using 1,1-carbonyldiimidazole. It is preferred to first add 1,1-carbonyldiimidazole to 2-(4-((4-cyano-2-fluorobenzyl)oxy)pyridin-2-yl)-2-fluoro-5-methylphenyl)acetic acid in a solvent, for example tetrahydrofuran, and allow adequate time for the generation of an active intermediate before adding the compound of Formula VII. Alternatively, the amide coupling step may be carried out using other coupling conditions, for example, using HATU (1-[bis(dimethylamino)methylene]-1H-1,2,3-triazolo[4,5-b]pyridinium 3-oxide hexafluorophosphate).

The cyclisation reaction in step (vii) may be carried out by heating, for example to above 80° C., optionally in the presence of an acid.

As set out above, when R in the compounds Formulae VI, VII, IX and X in steps (iv), (v), (vi) and (vii) is an acid protecting group, the process may further comprises the step (step (viii)) of hydrolyzing the ester compound to provide the final acid compound (Formula X'). This step may be carried out, for example, by heating the ester in the presence of a base, such as lithium hydroxide.

In a particular embodiment, R in the compounds Formulae VI, VII, IX and X in steps (iv), (v), (vi) and (vii) is H and the final step (viii) is not needed. This is advantageous because it reduces the number of synthetic steps. Furthermore, if this hydrolysing step is performed by heating the ester in the presence of a base, this step may result in an undesirable side reaction at the nitrile group.

Steps (iv), (v), (vi), and (vii) all involve compounds having R group. At each occurrence, R is a H or an acid protecting group. As the skilled person will appreciate, the R group remains the same through each of these sequential steps. In one embodiment, R is H. In another embodiment, R is $C_{1-4}$ alkyl, preferably methyl. In step (viii), the compound of Formula X wherein R is an acid protecting group is hydrolyzed to a compound of Formula X wherein R is H (Formula X').

The compounds of Formulae I, II, III, IV, VI, VII, IX and X all have a chiral center at the point of attachment of the oxirane or oxetane. Whilst, the process steps include the use of all individual enantiomers, and mixtures thereof, as well as racemates, certain configurations are preferred:

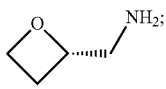

Formula Ia

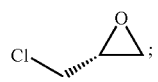

Formula IIb

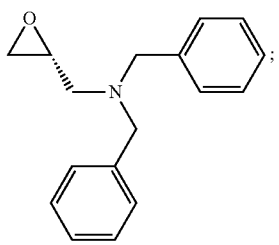

Formula IIIb

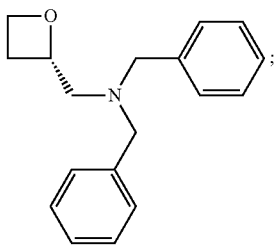

Formula IVa

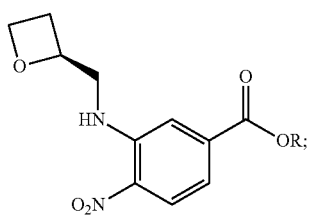

Formula VIa

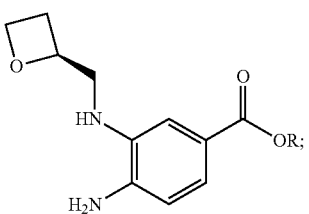

Formula VIIa

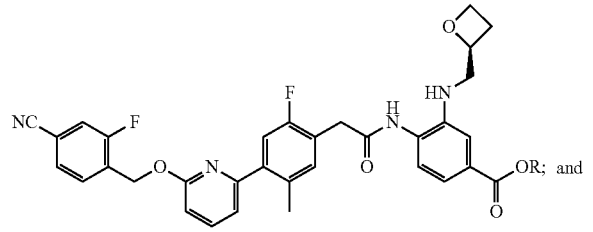

Formula IXa

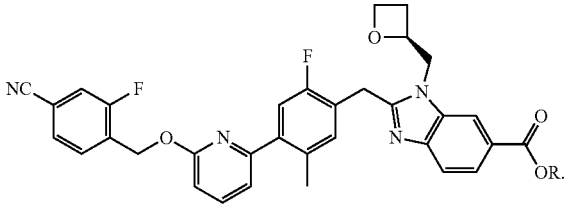

Formula Xa

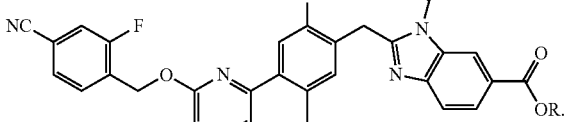

Formulae Ia, IVa, VIa, VIIa, IXa and Xa represent the S-enantiomer. Formula IIb and IIIb represent the R-enantiomer.

The term "pharmaceutically acceptable salt" as used herein refers a salt of a compound considered to be acceptable for clinical and/or veterinary use. Examples of pharmaceutically acceptable salts and common methodologies for preparing them can be found in "Handbook of Pharmaceutical Salts: Properties, Selection and Use" P. Stahl, et al., 2nd Revised Edition, Wiley-VCH, 2011 and S. M. Berge, et al., "Pharmaceutical Salts", *Journal of Pharmaceutical Sciences*, 1977, 66(1), 1-19. A preferred salt of the compound of Formula X is the tert-butyl amine (or erbumine) salt.

R in the compounds of formulae V, VI, VII, IX, and X described herein may be an acid protecting group. It is understood that protecting groups may be varied as appreciated by one of skill in the art depending on the particular reaction conditions and the particular transformations to be performed. Acid protecting groups, as well as protection and deprotection conditions are well known to the skilled artisan and are described in the literature (see for example "*Greene's Protective Groups in Organic Synthesis*", Fourth Edition, by Peter G. M. Wuts and Theodora W. Greene, John Wiley and Sons, Inc. 2007).

Certain abbreviations are defined as follows: "ACN" refers to acetonitrile; "DCM" refers to dichloromethane; "DMEA" refers to N,N-Dimethylethylamine; "DMF" refers to N,N-dimethylformamide; "DMSO" refers to dimethyl sulfoxide; "ES-MS" refers to Electrospray Mass Spectrometry; "EtOAc" refers to ethyl acetate; "EtOH" refers to ethanol or ethyl alcohol; "h" refers to hour or hours; "HPLC" refers to high-performance liquid chromatography; "MeOH" refers to methanol or methyl alcohol; "MTBE" refers to methyl-tert-butyl ether; "min" refers to minute or minutes; "m/z" refers to mass-to-charge ratio; "Pd(dppf)Cl$_2$" refers to [1,1'-bis(diphenylphosphino)ferrocene]dichloropalladium(II); "RT" refers to room temperature; "TFA" refers to trifluoroacetic acid; and "THF" refers to tetrahydrofuran.

The X-ray powder diffraction (XRPD) patterns of crystalline solids are obtained on a Bruker D4 Endeavor X-ray powder diffractometer, equipped with a CuKα source and a Vantec detector, operating at 35 kV and 50 mA. The sample is scanned between 4 and 40 2θ°, with a step size of 0.008 2θ° and a scan rate of 0.5 seconds/step, and using 1.0 mm divergence, 6.6 mm fixed anti-scatter, and 11.3 mm detector slits. The dry powder is packed on a quartz sample holder and a smooth surface is obtained using a glass slide. The crystal form diffraction patterns are collected at ambient temperature and relative humidity. Crystal peak positions are determined in MDI-Jade after whole pattern shifting based on an internal NIST 675 standard with peaks at 8.853 and 26.774 2θ°. It is well known in the crystallography art that, for any given crystal form, the relative intensities of the diffraction peaks may vary due to preferred orientation resulting from factors such as crystal morphology and habit. Where the effects of preferred orientation are present, peak intensities are altered, but the characteristic peak positions of the polymorph are unchanged. See, e.g. The United States Pharmacopeia #23, National Formulary #18, pages 1843-1844, 1995. Furthermore, it is also well known in the crystallography art that for any given crystal form the angular peak positions may vary slightly. For example, peak positions can shift due to a variation in the temperature at which a sample is analyzed, sample displacement, or the presence or absence of an internal standard. In the present case, a peak position variability of ±0.2 2θ° is presumed to take into account these potential variations without hindering the unequivocal identification of the indicated crystal form. Confirmation of a crystal form may be made based on any unique combination of distinguishing peaks.

Preparation 1

(R)-1-Chloro-3-(dibenzylamino)propan-2-ol

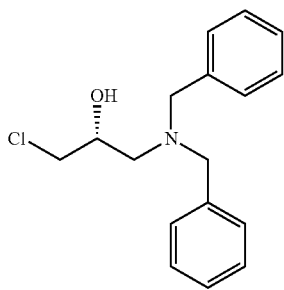 [SMILES: O[C@@H](CCl)CN(Cc1ccccc1)Cc1ccccc1]

To a flask, add dibenzylamine (200.0 g, 0.993 mol) and 2-propanol (200 mL). Cool the solution with stirring to below 5° C. with an ice/water bath. Use an addition funnel to add (R)-(−)-epichlorohydrin (95 mL, 1.21 mol) over 10 min. Warm the mixture to 21° C. and stir for two days, then refrigerate the resulting solution containing the title compound until use in the next step. ES-MS m/z 290 (M+H).

Preparation 2

(R)—N,N-Dibenzyl-1-(oxiran-2-yl)methanamine

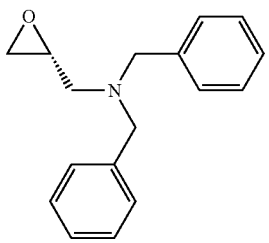 [SMILES: c1ccc(CN(Cc2ccccc2)C[C@@H]2CO2)cc1]

Method A: Pour the solution of (R)-1-chloro-3-(dibenzylamino)propan-2-ol from Preparation 1 into a flask with mechanical stirring and use 2-propanol (466 mL) to complete the transfer. Cool the solution with ice water to below 5° C., add a solution of sodium hydroxide (5 mol/L in water, 240 mL, 1.18 mol) in five portions and then warm the mixture to 20° C. After 6 h, transfer the mixture to a separatory funnel with toluene (500 mL) and water (100 mL). Shake the mixture, allow layers to separate, and remove the bottom layer. Add water (250 mL), shake the mixture and allowed to settle, and then remove the bottom layer. Add saturated aqueous NaCl, shake the mixture and allow to separate, and remove the bottom layer. Dry the solution with sodium sulfate, filter, and concentrate the solution by rotary evaporation. Dry the residue in-vacuo to give the title compound as a syrup (270.7 g, 99% yield over 2 steps), which by $^1$H-NMR appears to contain 8.7% w/w toluene. $^1$H-NMR (400 MHz, CDCl$_3$) δ 7.45-7.23 (m, 10H), 3.82 (brd, J=13.6 Hz, 2H), 3.59 (brd, J=13.6 Hz, 2H), 3.10 (br, 1H), 2.79 (brd, J=12.8 Hz, 1H), 2.70 (t, J=4.4 Hz, 1H), 2.48-2.40 (m, 2H). ES-MS m/z 254 (M+H).

Method B (one pot procedure from (R)-(−)-epichlorohydrin): To a vessel, add dibenzylamine (152 kg, 770 mol) and 2-propanol (121 kg) and stir the mixture at 10-20° C. Slowly add (R)-(−)-epichlorohydrin (105 kg, 1135 mol) and stir the mixture at 10-20° C. until the reaction reaches <1% epichlorohydrin remaining. Slowly add 20% w/w sodium hydroxide in water (183 kg, 915 mol NaOH) and stir the mixture at 20-25° C. Add another portion of 20% w/w sodium hydroxide in water (20 kg, 100 mol NaOH) and stir the mixture at 20-25° C. until there is <0.5% intermediate remaining. Separate the layers and concentrate the organic layer under reduced pressure to approximately 200 L remaining volume. Add EtOAc (688 kg), concentrate the mixture again under reduced pressure to approximately 200 L remaining volume, then add EtOAc (683 kg) and water (460 kg). Stir the mixture, then settle, and separate the aqueous layer. Add another portion of water (461 kg) to the organic layer. Stir the mixture, then settle, and separate the aqueous layer. Add another portion of water (451 kg) to the organic layer. Stir the mixture, then settle, and separate the aqueous layer. Concentrate the organic layer under reduced pressure to approximately 130 L remaining, then add tert-butanol (595 kg). Concentrate the mixture under reduced pressure to approximately 130 L remaining. Dilute the solution with tert-butanol (167 kg) to give a solution of the title compound (373.4 kg solution, 50.8 wt %, 189.7 kg of title compound, 749 mol, 97% yield). HPLC retention time for the title compound is 14.0 min [HPLC: Waters)(Bridge C18 (4.6× 150 mm, 3.5 μm), 35° C., 1.2 mL/min, 215 nm detection, gradient: 5-95% B in 16 min, hold to 18 min, 5% B at 18.1 min; Solvent A=10 mM ammonium formate, pH 9.0, in purified water, Solvent B=ACN].

Preparation 3

(S)—N,N-Dibenzyl-1-(oxetan-2-yl)methanamine

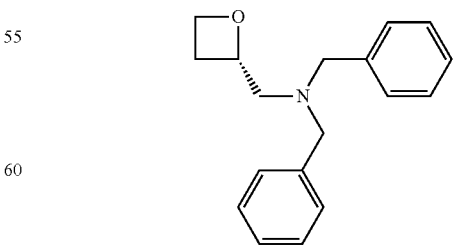

Method A: Equip a flask with mechanical stirring, a nitrogen source, a heating mantle, condenser, and thermocouple. Add trimethylsulfoxonium iodide (66.5 g, 0.278 mol), followed by solid potassium tert-butoxide (45.7 g, 0.371 mol) and tert-butanol (500 mL) to the flask. Stir and heat the solution to 85° C. and add a solution of (R)—N,N-dibenzyl-1-(oxiran-2-yl)methanamine (neat material from Preparation 2, Method A, 50.0 g, 0.186 mol) in tert-butanol (250 mL) via pressure transfer. Heat the mixture at 80-85° C. (gentle reflux) for 5 h, then cool and remove the solids by filtration. Wash the solids with hexanes (200 mL) and combine the hexanes wash filtrate with the initial filtrate. Partially concentrate the product solution by rotary evaporation and transfer to a separatory funnel with hexanes (500 mL) and water (200 mL). Shake the mixture, allow to settle, and drain the bottom layer. Add water (200 mL), shake the mixture, allow to settle, and drain the lower layer; repeat this two more times. Wash the organic layer with saturated aqueous NaCl and dry over sodium sulfate. Remove the sodium sulfate by filtration and concentrate the solution by rotary evaporation to an oil. Purify the oil by silica gel chromatography using 15% EtOAc in hexanes to give the title compound (23.4 g, 40%) as a yellow oil which by $^1$H-NMR appears to be ~85% pure. $^1$H-NMR (400 MHz, CDCl$_3$) δ 7.40-7.22 (m, 10H), 5.03 (brpent, J=5.8 Hz, 1H), 4.63 (td, J=6.1, 8.0 Hz, 1H), 4.46 (td, J=5.9, 9.1 Hz, 1H), 3.70 (brd, J=13.7 Hz, 2H), 3.62 (brd, J=13.7 Hz, 2H), 2.82 (dd, J=6.1, 13.5 Hz, 1H), 2.71 (dd, J=4.5, 13.5 Hz, 1H), 2.56 (m, 1H), 2.36 (m, 1H). ES-MS m/z 268 (M+H).

To assess the optical purity of the title compound, prepare the title compound as a racemic mixture essentially as described in Preparations 1 to 3 starting with racemic epichlorohydrin.

Analyze the racemic mixture by chiral HPLC (column: Chiralcel® OD-H 4.6×150 mm; flow rate 1 mL/min; detection at 254 nm; eluent: 2:98 EtOH/heptane (v/v)+0.1% DMEA). Retention times for the individual enantiomers in the racemic sample using this method are 7.48 min and 8.59 min. Analysis of the optically pure material shows 96% ee (1.8% at 7.49 min and 86.0% at 8.61 min by UV peak area).

Method B: Add trimethylsulfoxonium iodide (250 kg, 1136 mol) to a vessel. Add potassium tert-butoxide (170.1 kg, 1516 mol), and tert-butanol (744 kg). Stir at 50-55° C. for 2-3 h, then at 65-75° C. for 15-30 min, then heat to 75-80° C. Slowly add a solution of (R)—N,N-dibenzyl-1-(oxiran-2-yl)methanamine in tert-butanol (from Preparation 2, Method B, 372.2 kg of solution, 50.8 wt %, 189 kg, 749 mol). Heat the mixture to 80-90° C. for 6-8 h, then cool to 30-40° C. and add EtOAc (534 kg). Filter the mixture and wash with EtOAc (51+54+60+59+59+60+60+60 kg). Concentrate the mixture under reduced pressure to approximately 200-400 L remaining, then add EtOAc (858 kg) and concentrate again under reduced pressure to approximately 200-400 L remaining. Add EtOAc (861.5 kg) and water (570 kg) and adjust the temperature of the mixture to 20-30° C. Stir, then settle the mixture and separate the layers. Add water (571 kg), stir, then settle the mixture and separate the layers.

Purify the organic layer in portions. Add a portion of the organic layer to a vessel (176 kg) and concentrate under reduced pressure to approximately 32 L remaining. Add a 4:1 v:v solution of heptane:EtOAc (25 kg), then silica gel (46 kg), and then heptane (107 kg) to the mixture. Stir the mixture for 2-3 h at 20-30° C., then filter and rinse the silica gel with three portions (~60 kg each) of a 10:1 w:w heptane:EtOAc solution, with 1.7 wt % triethylamine. Combine the filtrates and concentrate under reduced pressure to approximately 20 L remaining, then add heptane (11 kg). Chromatograph the heptane solution through a pad of silica gel (60 kg) eluting a mixture of 10:1 w:w heptane:EtOAc, with 1.7 wt % triethylamine, combining the fractions containing product for further processing. Process the remaining portions of the organic similarly and combine all chromatographed product fractions.

Concentrate the product fractions under reduced pressure to approximately 200 L remaining. Add EtOH (470 kg) to the mixture and concentrate under reduced pressure to approximately 200 L remaining. Dilute the mixture with EtOH (297 kg) to give a solution of the title compound (407.8 kg solution, 18.7 wt %, 76.3 kg of title compound, 285 mol, 38% yield). HPLC retention time for the title compound is 9.8 min [HPLC: Agilent Zorbax Bonus RP (4.6×150 mm, 3.5 µm), 35° C., 1.2 mL/min, 215 nm detection, gradient: 5-50% B in 15 min, to 95% B at 20 min, hold to 22 min, 5% B at 22.1 min; Solvent A=0.05% TFA in purified water, Solvent B=0.05% TFA in ACN].

Preparation 4

(S)-Oxetan-2-ylmethanamine hydrochloride

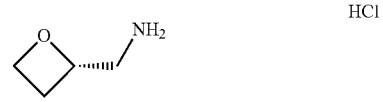

In a pressure bottle, dissolve (S)—N,N-dibenzyl-1-(oxetan-2-yl)methanamine (neat material from Preparation 3, Method A, 46.0 g, 172 mmol) in EtOH (460 mL) and add aqueous HCl (5 M, 31 mL, 155 mmol). Add palladium on carbon (60% water by weight, 5% Pd loading on dry basis, 9.2 g) and stir the mixture at ambient temperature under 40 psig hydrogen for 20 h. Remove the catalyst by filtration through Celite® and remove the solvent by rotary evaporation. The residue is a colorless oil, which crystallizes upon standing to afford the title compound (20.8 g, 98%). $^1$H-NMR (400 MHz, DMSO-d6) δ 7.98 (br, 3H), 4.90 (m, 1H), 4.52 (ddd, J=5.9, 7.2, 8.6 Hz, 1H), 4.46 (td, J=6.2, 9.0 Hz, 1H), 3.05 (dd, J=6.4, 13.5 Hz, 1H), 2.98 (dd, J=4.3, 13.5 Hz, 1H), 2.66 (m, 1H), 2.52 (m, 1H).

Preparation 5

(S)-Oxetan-2-ylmethanamine

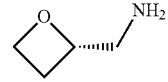

Add the EtOH solution of (S)—N,N-dibenzyl-1-(oxetan-2-yl)methanamine from Preparation 3, Method B to a vessel (203.6 kg of solution, 18.7 wt %, 38.1 kg of starting material, 142 mol). Add activated carbon (3.9 kg) to the solution and rinse in with EtOH (5 kg). Stir the mixture for 4-6 h, then filter and rinse with EtOH (38+39+38 kg). Concentrate the solution to approximately 152 L remaining (187.6 kg solution, 19.9 wt %, 37.3 kg of starting material, 140 mol), then add acetic acid (10 kg) and rinse in with EtOH (2 kg). Add palladium on carbon (50% water by weight, 10 wt % Pd loading on dry basis, 1.87 kg) to the mixture and rinse in with EtOH (3×5 kg). Subject the mixture to 0.3-0.5 Mpa hydrogen pressure and heat to 40-50° C. After 5-6 h, add another portion of palladium on carbon (1.87 kg) to the reaction mixture and rinse in with EtOH (5+10+6 kg). Resubject to reaction mixture to 0.3-0.5 Mpa hydrogen at 40-50° C. After 5-6 h, add another portion of palladium on carbon (1.87 kg), rinse in with EtOH (10+10+11 kg), and resubject the reaction mixture to 0.3-0.5 Mpa hydrogen at 40-50° C. After 5-6 h, add another portion of palladium on carbon (1.87 kg), rinse in with EtOH (10+5+6 kg), and resubject the reaction mixture to 0.3-0.5 Mpa hydrogen at 40-50° C. After 6-8 h, add another portion of palladium on carbon (0.38 kg), rinse in with EtOH (6+7+5 kg), and resubject the reaction mixture to 0.3-0.5 Mpa hydrogen at 40-50° C. After 5-6 h, cool the reaction mixture to 15-25° C., filter through diatomite (7 kg), and rinse with EtOH (40+48 kg). The title compound is obtained as an EtOH solution (381 kg solution, 2.8 wt %, 10.75 kg of title compound, 123 mol, 87% yield). Retention time for the title compound is 6.6 min [GC: DB-624, 30 m×0.32 mm ID×1.8 μm, FID detection at 280° C., Makeup ($N_2$) flow 30 mL/min, $H_2$ flow 40 mL/min, air flow 400 mL/min, 60° C. for 1 min, ramp 30° C./min to 130° C., hold 6 min, ramp 30° C./min to 240° C., hold 22 min. Injector temperature 240° C., 10:1 split ratio.]

Preparation 6

Methyl (S)-4-nitro-3-((oxetan-2-ylmethyl)amino)benzoate

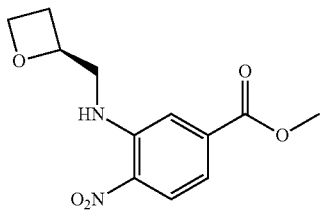 [SMILES: COC(=O)c1ccc([N+](=O)[O-])c(NC[C@@H]2CCO2)c1]

Dissolve (S)-oxetan-2-ylmethanamine hydrochloride (20.8 g, 168 mmol) in DMF (150 mL) and add methyl 3-fluoro-4-nitro-benzoate (30.0 g, 151 mmol), followed by triethylamine (45.7 g, 452 mmol). Stir the mixture for 20 h at ambient temperature. Pour the mixture into a separatory funnel and add MTBE (400 mL) and water (400 mL). Shake the mixture, allow to settle, and remove the bottom layer. Wash the organic layer sequentially with water, saturated aqueous NaCl, and then dry with sodium sulfate. After filtration, concentrate the solution by rotary evaporation and chromatograph on silica gel (1.5 kg) using EtOAc/isohexanes (gradient elution, 0 to 40% (vol/vol) EtOAc to isohexanes). Combine the product-rich fractions and concentrate by rotary evaporation to afford the product as a yellow solid (33.3 g, 125 mmol, 83% yield). Chiral HPLC analysis indicates the product had 94.2% ee (e.r.=97.1:2.9).

Chiral HPLC Conditions: 3:7 (v/v) EtOH/heptane with 0.1% (w/w) DMEA, Chiralpak AD-H, 4.6×150 mm, 1 mL/min, 254 nm, S enantiomer=7.93 min, R enantiomer=9.50 min. 1H-NMR (400 MHz, $CDCl_3$) δ 8.37 (br, 1H), 8.25 (d, J=9.0 Hz, 1H), 7.64 (d, J=1.6 Hz, 1H), 7.28 (dd, J=1.8, 8.8 Hz, 1H), 4.76 (ddd, J=6.1, 7.6, 8.4 Hz, 1H), 4.64 (td, J=6.0, 9.2 Hz, 1H), 3.95 (s, 3H), 3.64 (t, J=4.9 Hz, 2H), 2.79 (m, 1H), 2.62 (m, 1H). ES-MS m/z 267 (M+H).

Preparation 7

(S)-4-Nitro-3-((oxetan-2-ylmethyl)amino)benzoic acid

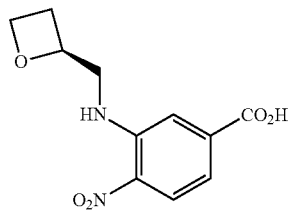

Add an EtOH solution of (S)-oxetan-2-ylmethanamine (from Preparation 5, 6.9 kg assay corrected, 79 mol) to 3-fluoro-4-nitrobenzoic acid (15.3 kg, 83 moles, 1.05 equivalents). Add triethylamine (26 kg, 257 mol, 3.1 equivalents) slowly, rinse with EtOH (3 kg), and heat the mixture to 110-120° C. in a sealed vessel until the 3-fluoro-4-nitrobenzoic acid is <2% remaining. Cool the mixture, transfer to a drum, and rinse with EtOH (15 kg). In a similar manner, process a total 20.7 net kg of (S)-oxetan-2-ylmethanamine (238 mol) and 45.6 kg of 3-fluoro-4-nitrobenzoic acid (246 mol) in three batches. Concentrate the combined EtOH solutions of the title compound to approximately 100 L remaining, then add EtOH (71 kg) and concentrate again to approximately 100 L remaining. Cool the mixture to 5-15° C. and slowly add 15% w/w citric acid in water (287 kg). Stir for 1-2 h, then filter the mixture and rinse with water (88+86 kg). Stir the wetcake from the filtration in EtOH (113 kg) and heat the mixture to 40-50° C. After 4-6 h, cool the mixture to 5-15° C., stir for 2-4 h, then filter and wash the cake with EtOH (28 kg). Dry the wetcake to obtain the title compound as an orange solid (34.6 kg, 32.4 kg assay corrected, 137 moles, 58% yield). $^1$H NMR (400 MHz, DMSO) δ 13.50 (s, 1H), 8.33 (t, J=5.8 Hz, 1H), 8.16 (d, J=8.9 Hz, 1H), 7.66 (d, J=1.7 Hz, 1H), 7.16 (dd, J=8.9, 1.7 Hz, 1H), 5.00 (m, 1H), 4.60-4.38 (m, 2H), 3.74-3.58 (m, 2H), 2.71-2.50 (m, 2H). HPLC retention time for the title compound is 12.5 min [HPLC: Agilent Zorbax Bonus RP (4.6×150 mm, 3.5 μm), 35° C., 1.2 mL/min, 237 nm detection, gradient: 5-95% B in 20 min, 5% B at 20.1 min; Solvent A=0.05% TFA in purified water, Solvent B=0.05% TFA in ACN].

Preparation 8

(S)-4-Amino-3-((oxetan-2-ylmethyl)amino)benzoic acid

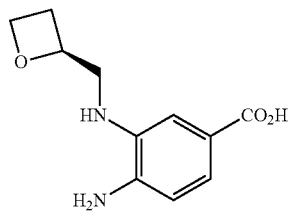 [SMILES: Nc1ccc(C(=O)O)cc1NC[C@@H]1CCO1]

To a vessel, add (S)-4-nitro-3-((oxetan-2-ylmethyl)amino)benzoic acid (3.55 kg, 13.9 moles) and THF (35 L).

Add palladium on carbon (50% water by weight, 10 wt % Pd loading on dry basis, 356 g). Subject the reaction mixture to hydrogen pressure (0.3 Mpa) at 35° C. until the reaction is complete. Filter the reaction mixture through Celite® to remove the catalyst, then concentrate to approximately 7 L remaining. Add back 17 L of EtOAc and concentrate again to approximately 7 L remaining. Add back another 17 L of EtOAc and concentrate to approximately 7 L remaining. Filter and rinse with EtOAc. Dry the wetcake under vacuum at 45-50° C. to obtain the title compound as a brown solid (2.89 kg, 12.6 mol, 91% yield). HPLC retention time for the title compound is 6.2 min [HPLC: Waters)(Bridge C18 (4.6×150 mm, 3.5 μm), 35° C., 1.2 mL/min, 237 nm detection, gradient: 5-95% B in 20 min, 5% B at 20.1 min; Solvent A=0.05% TFA in purified water, Solvent B=0.05% TFA in ACN].

Preparation 9

(S)-4-(2-(4-(6-((4-Cyano-2-fluorobenzyl)oxy)pyridin-2-yl)-2-fluoro-5-methylphenyl)acetamido)-3-((oxetan-2-ylmethyl)amino)benzoic acid

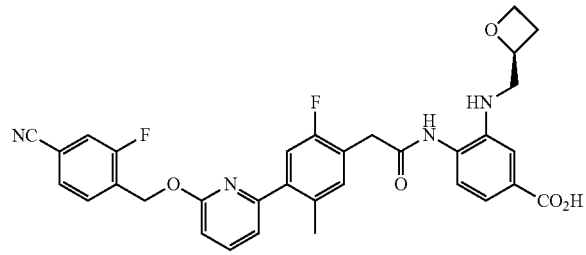 [SMILES: Cc1cc(CC(=O)Nc2ccc(C(=O)O)cc2NC[C@@H]2CCO2)c(F)cc1-c1cccc(OCc2ccc(C#N)cc2F)n1]

To a vessel, add 2-[4-[6-[(4-cyano-2-fluoro-phenyl)methoxy]-2-pyridyl]-2-fluoro-5-methyl-phenyl]acetic acid (4.75 kg, 13.6 mol) (Preparations 9a to 9f below) and THF (25 kg). Add 1,1-carbonyldiimidazole (2.6 kg, 17.7 mol, 1.3 equivalents) and rinse in with THF (4 kg). Heat the mixture to 35-40° C. for 0.5-1 h, then add (S)-4-amino-3-((oxetan-2-ylmethyl)amino)benzoic acid (2.8 kg, 14.3 mol, 1.05 equivalents) and rinse in with THF (4.2 kg). Stir the mixture at 35-40° C. until the reaction is complete, then cool to 20-30° C. and add 5% citric acid in water (18.5 kg). Add EtOAc (22 kg), stir the mixture, then settle and separate the layers. Add another portion of 5% citric acid in water (18.5 kg) to the organic layer. Stir, then settle and separate the layers. Add water (23.9 kg) to the organic layer. Stir, then settle and separate the layers. Add THF (32.8+26 kg), then add Si-Thiol scavenger (0.5 kg) and stir the mixture for 6-8 h. Filter off the scavenger and rinse with THF (11 kg). Concentrate the mixture to approximately 10-15 L remaining, then add EtOAc (21 kg). Repeat this twice two 20 kg portions of EtOAc. Concentrate the mixture again to approximately 10-15 L remaining, then add EtOAc (20 kg). Concentrate the mixture a third time to approximately 10-15 L remaining, then add EtOAc (20 kg). Filter, then rinse the wetcake with EtOAc (13 kg). Dry the wetcake under vacuum practically at 30-40° C. to obtain the title compound as a practically white solid (4.35 kg, 8.2 mol, 60% yield). HPLC retention time for the title compound is 16.0 min. [HPLC: Waters)(Bridge C18 (4.6×150 mm, 3.5 μm), 35° C., 1.2 mL/min, 230 nm detection, gradient: 5-40% B in 7 min, to 95% B at 19 min, hold until 21 min, to 5% B at 21.1 min; Solvent A=0.05% TFA in purified water, Solvent B=0.05% TFA in ACN].

2-[4-[6-[(4-cyano-2-fluoro-phenyl)methoxy]-2-pyridyl]-2-fluoro-5-methyl-phenyl]acetic acid, one of the starting materials in Preparation 9 above may be prepared according to preparations below:

Preparation 9a (4-Bromo-2-fluoro-5-methylphenyl)methanol

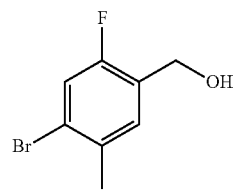

To a flask add: 4-bromo-2-fluoro-5-methylbenzoic acid (100 g, 421 mmol), THF (200 mL) and borane (dimethyl sulfide complex, 2 mol/L solution in THF, 210 mL, 10 mmol). Stir the mixture at RT overnight. Quench the reaction mixture with HCl (1.0 N aqueous solution, 50 mL) and filter the mixture. Concentrate the filtrate in-vacuo and partition the residue between EtOAc (400 mL) and water (400 mL). Wash the organics with saturated aqueous NaCl (400 mL), dry over $Na_2SO_4$, filter, and concentrate to give the title compound as solid (93.5 g, 99%). $^1$H-NMR (400 MHz, $CDCl_3$) δ 7.29 (d, J=7.9 Hz, 1H), 7.26 (d, J=9.1 Hz, 1H), 4.69 (s, 2H), 2.38 (s, 3H).

Preparation 9b 2-(4-Bromo-2-fluoro-5-methylphenyl)acetonitrile

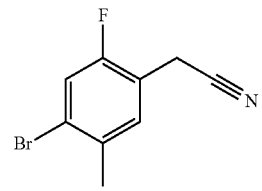

Dissolve (4-bromo-2-fluoro-5-methylphenyl)methanol (92 g, 420 mmol) in DCM (500 mL) and add triethylamine (120 mL, 861 mmol). Cool the mixture to −15° C. and add a solution of methanesulfonyl chloride (40 mL, 517 mmol) in DCM (30 mL) dropwise to the reaction mixture. Stir the mixture for 30 min at RT. Partition the reaction mixture between DCM (500 mL) and water (500 mL). Wash the organics with saturated aqueous NaCl (500 mL), dry over $Na_2SO_4$, filter, and concentrate. Dissolve the residue in DMF (400 mL) and cool the mixture with an ice bath. Add NaCN (21.0 g, 429 mmol) in one portion to the reaction mixture and stir at RT overnight. Partition the mixture between EtOAc (400 mL) and water (500 mL). Wash the organics with saturated aqueous NaCl (500 mL), dry over $Na_2SO_4$, filter, and concentrate. Purify the residue by silica gel chromatography using a gradient of 10 to 30% EtOAc in hexanes to give the title compound (47.0 g, 48%) as an oil.

1H-NMR (400 MHz, CDCl₃) δ 7.34 (d, J=8.7 Hz, 1H), 7.32 (d, J=8.1 Hz, 1H), 3.71 (s, 2H), 2.41 (s, 3H).

Preparation 9c

Methyl 2-(4-bromo-2-fluoro-5-methyl-phenyl)acetate

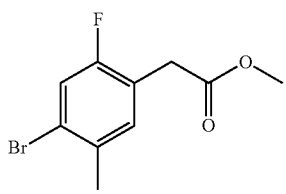

To a flask add: 2-(4-bromo-2-fluoro-5-methylphenyl)acetonitrile (1.20 g, 5.10 mmol), EtOH (5 mL), water (3 mL), and potassium hydroxide (0.90 g, 16 mmol). Heat the mixture at 90° C. overnight. Cool the mixture with an ice bath and acidify with 1.0 M HCl to pH 4-5, then partition the mixture between EtOAc (30 mL) and water (30 mL). Wash the organics with saturated aqueous NaCl (30 mL), dry over Na₂SO₄, filter, and concentrate to give 2-(4-bromo-2-fluoro-5-methyl-phenyl)acetic acid as solid. Dissolve this in DCM (10 mL), then add DMF (0.05 mL, 0.6 mmol) and oxalyl chloride (0.5 mL, 6 mmol) at RT. Stir the mixture RT for 30 min, then add MeOH (2 mL, 49.4 mmol) dropwise. After 30 min, remove the solvent in-vacuo and partition the residue between EtOAc (40 mL) and 5% NaHCO₃ (30 mL). Wash the organics with saturated aqueous NaCl (40 mL), dry over Na₂SO₄, filter, and concentrate to give the title compound as an oil (1.1 g, 80%). ES/MS m/z ($^{79}$Br,$^{81}$Br) 278,280 (M+NH₄⁺).

Preparation 9d

Methyl 2-[2-fluoro-4-(6-hydroxy-2-pyridyl)-5-methyl-phenyl]acetate

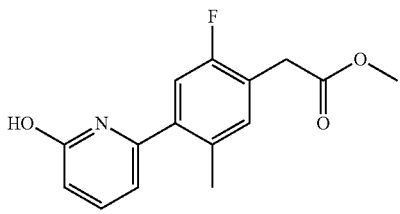 [SMILES: COC(=O)Cc1cc(C)c(-c2cccc(O)n2)cc1F]

To a flask add 6-hydroxypyridine-2-boronic acid pinacol ester (1.6 g, 6.9 mmol), methyl 2-(4-bromo-2-fluoro-5-methyl-phenyl)acetate (2.2 g, 8.4 mmol), THF (15 mL), water (1 mL), and potassium carbonate (2.0 g, 14 mmol). Purge the mixture with nitrogen for 10 min, then add Pd(dppf)Cl₂ (0.26 g, 0.35 mmol) and heat at 75° C. for 2 h. Partition the mixture between EtOAc (30 mL) and water (30 mL). Wash the organics with saturated aqueous NaCl (30 mL), dry over Na₂SO₄, filter and concentrate to give the title compound (1.4 g, 74%) as a solid. ES/MS m/z 276 (M+H), 274 (M-H).

Preparation 9e

Methyl 2-[4-[6-[(4-cyano-2-fluoro-phenyl)methoxy]-2-pyridyl]-2-fluoro-5-methyl-phenyl]acetate

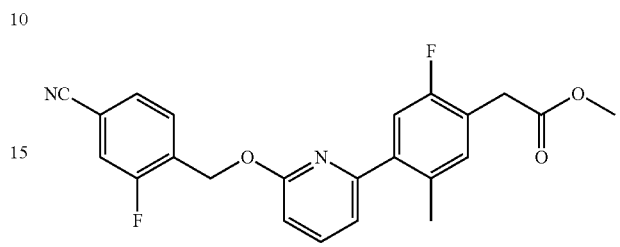

To a flask add methyl 2-[2-fluoro-4-(6-hydroxy-2-pyridyl)-5-methyl-phenyl]acetate (1.40 g, 5.09 mmol), 1,4-dioxane (35 mL), silver carbonate (1.7 g, 6.2 mmol), and 4-(bromomethyl)-3-fluorobenzonitrile (1.4 g, 6.2 mmol). Heat the mixture at 60° C. overnight. Filter off the solid and concentrate the filtrate. Purified the residue by silica gel chromatography using 12 to 55% EtOAc in hexanes to give the title compound (1.60 g, 77%) as a solid. ES/MS m/z 409 (M+H), 407 (M-H).

Preparation 9f

2-[4-[6-[(4-Cyano-2-fluoro-phenyl)methoxy]-2-pyridyl]-2-fluoro-5-methyl-phenyl]acetic acid

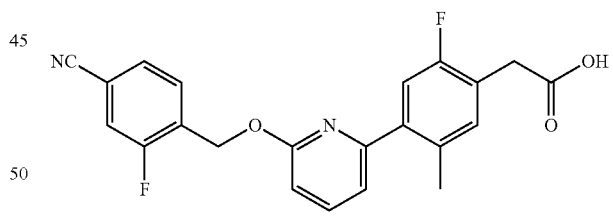

To a vial add methyl 2-[4-[6-[(4-cyano-2-fluoro-phenyl)methoxy]-2-pyridyl]-2-fluoro-5-methyl-phenyl]acetate (1.6 g, 3.9 mmol), ACN (20 mL), water (6 mL), and lithium hydroxide (0.45 g, 19 mmol). Heat the mixture at 45° C. for 2 h, cool the mixture with an ice bath, and acidify with 1.0 M HCl to pH=4-5. Partition the mixture between EtOAc (50 mL) and water (50 mL). Wash the organics with saturated aqueous NaCl (50 mL), dry over Na₂SO₄, filter and concentrated to give the title compound (1.55 g, 100%) as solid. ES/MS m/z 395 (M+H).

Preparation 10 tert-Butylammonium; 2-[[4-[6-[(4-cyano-2-fluoro-phenyl)methoxy]-2-pyridyl]-2-fluoro-5-methyl-phenyl]methyl]-3-[[(2S)-oxetan-2-yl]methyl]benzimidazole-5-carboxylate

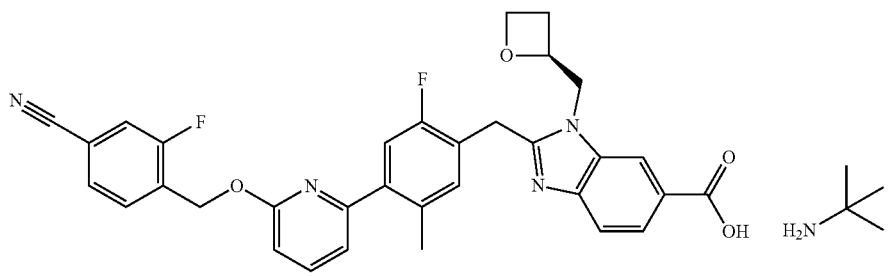

Mix (S)-4-(2-(4-(6-((4-cyano-2-fluorobenzyl)oxy)pyridin-2-yl)-2-fluoro-5-methylphenyl)acetamido)-3-((oxetan-2-ylmethyl)amino)benzoic acid (2.05 kg, 3.4 moles) and THF (19 kg), heat the mixture to 115-125° C. in a sealed vessel until the reaction is complete, then rinse into a drum with THF (7 kg). Combine this reaction with another reaction run in similar fashion on 2.05 kg scale. Recirculate the solution of product through an activated carbon cartridge filter for 6-8 h, then rinse the filter with THF (7.8 kg). Recirculate this solution through a fresh activated carbon cartridge filter for 4-6 h, then rinse the filter with THF (8.4 kg). Concentrate the solution to 8-12 L remaining, then add acetone (17 kg). Concentrate the solution again to 8-12 L remaining, then add acetone (18 kg). Concentrate the solution a third time to 8-12 L remaining and add acetone (38 kg). Heat the mixture to 45-55° C. and add purified water (1.7 kg). Prepare a solution of 2-methyl-2-propanamine (0.7 kg, 9.6 mol, 1.4 equivalents) in acetone (3.4 kg). Add ⅓ of the 2-methyl-2-propanamine solution to the product solution. Add seed crystals of the title compound (18.57 g) and stir the mixture for 1-2 h, then add the remaining 2-methyl-2-propanamine solution slowly. Stir the mixture for 1-2 h, then cool to 15-20° C. slowly. Filter off the solid and rinse with acetone (10 kg). Dry the solid under vacuum at 45-55° C. to obtain the title compound as a white solid (3.48 kg, 5.1 mol, 75% yield). HPLC retention time for the title compound is 14.8 min. [HPLC: Waters)(Bridge C18 (4.6×150 mm, 3.5 μm), 35° C., 1.2 mL/min, 220 nm detection, gradient: 5-40% B in 6 min, to 95% B at 28 min, to 5% B at 28.1 min; Solvent A=0.05% TFA in purified water, Solvent B=0.05% TFA in ACN].

A prepared sample of the title compound is characterized by an XRD pattern using CuKα radiation as having diffraction peaks (2-theta values) as described in Table 1 below, and in particular having peaks at 6.9 in combination with one or more of the peaks selected from the group consisting of 16.3 and 22.5; with a tolerance for the diffraction angles of 0.2 degrees.

TABLE 1

X-ray powder diffraction peaks of tert-butylammonium; 2-[[4-[6-[(4-cyano-2-fluoro-phenyl)methoxy]-2-pyridyl]-2-fluoro-5-methyl-phenyl]methyl]-3-[[(2S)-oxetan-2-yl]methyl]benzimidazole-5-carboxylate

| Peak | Angle (°2-Theta) +/− 0.2° | Relative Intensity (% of most intense peak) |
| --- | --- | --- |
| 1 | 5.5 | 26.20% |
| 2 | 6.9 | 64.90% |
| 3 | 11.2 | 49.20% |
| 4 | 16.3 | 100.00% |
| 5 | 17.1 | 34.70% |
| 6 | 19.6 | 53.00% |
| 7 | 21.8 | 43.10% |
| 8 | 22.5 | 93.80% |
| 9 | 27.3 | 41.10% |
| 10 | 28.0 | 37.90% |

I claim:
1. A process for preparing a compound of the formula:

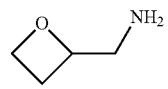

or salt thereof, comprising the steps of:
  i. combining dibenzylamine and a compound of the formula:

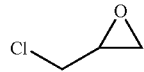

then adding a base to produce a compound of the formula:

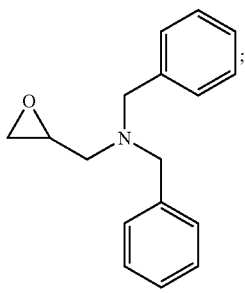 [SMILES: c1ccc(CN(Cc2ccccc2)CC2CO2)cc1]

ii. taking trimethylsulfuxonium halide in the presence of a base and combining with a solution of the compound resulting from step (i) and heating to above 40° C. to produce a compound of the formula:

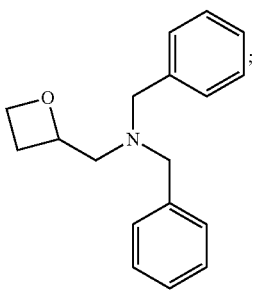 [SMILES: c1ccc(CN(Cc2ccccc2)CC2CCO2)cc1]

iii. deprotecting the compound resulting from step (ii).

2. The process according to claim 1, wherein the compound prepared is a compound of the formula:

or salt thereof.

3. The process according to claim 1, wherein the trimethylsulfuxonium halide is trimethylsulfuxonium iodide.

4. The process according to claim 1, wherein the base in step (ii) is selected from the group consisting of: potassium tert-butoxide, lithium tert-butoxide, sodium tert-butoxide, potassium tert-amylate, lithium tert-amylate, sodium tert-amylate, potassium lithium hydride, sodium hydride, potassium hydride, n-butyl lithium in alcohol solvent, lithium hexamethyldisilazide, sodium hexamethyldisilazide, and potassium hexamethyldisilazide.

5. The process according to claim 4, wherein the base is potassium tert-butoxide.

6. The process according to claim 1, wherein the solution in step (ii) comprises a solvent selected from the group consisting of: tert-butanol, dimethyl sulfoxide, dimethylformamide, dimethylacetamide, N-Methyl-2-pyrrolidone, and tert-amyl alcohol.

7. The process according to claim 6, wherein the solvent is tert-butanol.

8. The process according to claim 1, wherein step (ii) is carried out at a temperature of greater than 70° C.

9. The process according to claim 1, wherein step (iii) is carried out using a palladium catalyst.

10. The process according to claim 9, wherein the palladium catalyst is palladium on carbon.

11. The process according to claim 1, further comprising the step of combining a base and a compound of the formula:

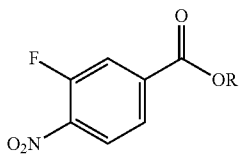

wherein R is H or an acid protecting group, with a solution of a compound of the formula:

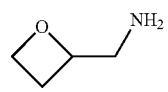

to produce a compound of the formula:

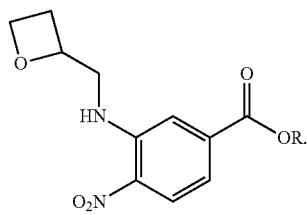

12. The process according to claim 11, wherein R is H or $C_{1-4}$ alkyl.

13. The process according to claim 11, further comprising the step of reducing the nitro group of the compound of formula:

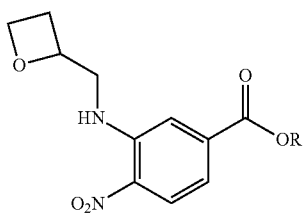

to produce a compound of the formula:

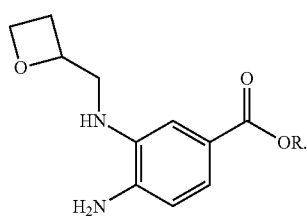

14. The process according to claim 13, further comprising the steps of:
   a. carrying out an amide coupling reaction with a compound of the formula:

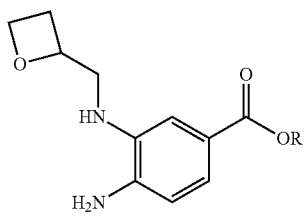

and a compound of the formula:

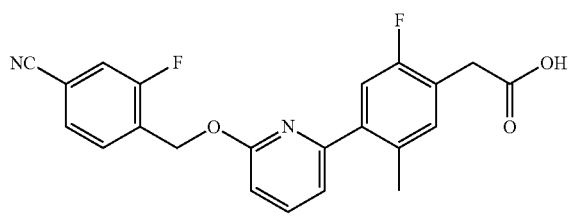 [SMILES: Cc1cc(CC(=O)O)c(F)cc1-c1cccc(OCc2ccc(C#N)cc2F)n1]

to produce a compound of the formula:

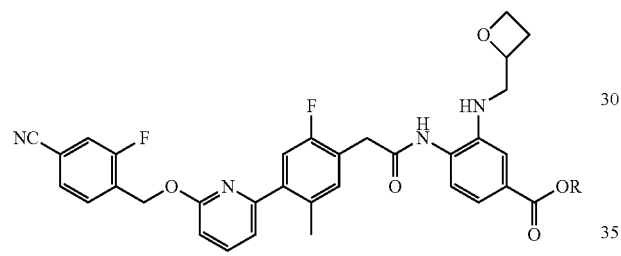

or salt thereof;

b. performing a cyclisation reaction on the compound resulting from step (a) to produce a compound of the formula:

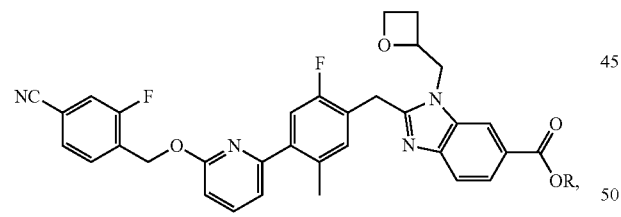

and optionally reacting to form a pharmaceutically acceptable salt thereof.

15. The process according to claim 14, wherein R is an acid protecting group and the process further comprises the step of hydrolyzing the ester compound to produce the acid compound of the formula:

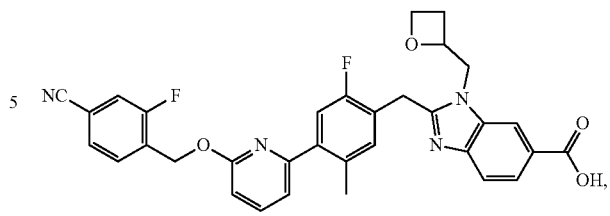

and optionally reacting to form a pharmaceutically acceptable salt thereof.

16. The process according to claim 14, wherein the compound prepared is the tert-butylamine salt of:

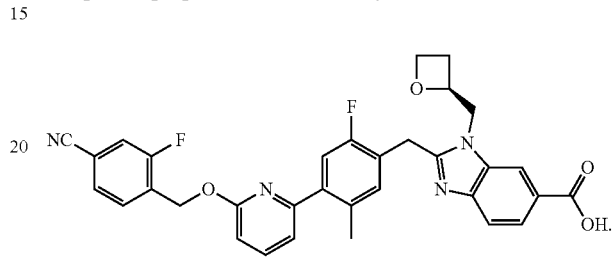

17. A compound of the formula:

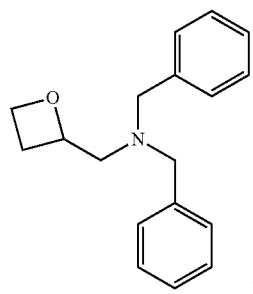

or salt thereof.

18. The compound according to claim 17, which is:

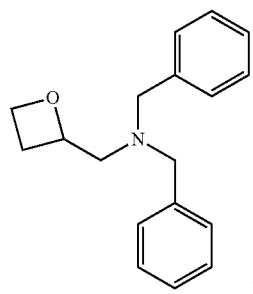

or salt thereof.

* * * * *